US005534103A

United States Patent [19]

Yano et al.

[11] Patent Number: 5,534,103

[45] Date of Patent: Jul. 9, 1996

[54] METHOD FOR BONDING OF A CERAMIC BODY AND A METALLIC BODY

[75] Inventors: Tetsuo Yano, Takamatsu; Toshihiko Ooie, Kida-gun; Masafumi Yoneda, Takamatsu; Akihiro Utsumi, Ayauta-gun; Munehide Katsumura; Jun Matsuda, both of Takamatsu, all of Japan

[73] Assignee: Japan as represented by Director General of Agency of Industrial Science and Technology, Tokyo, Japan

[21] Appl. No.: 318,550

[22] Filed: Oct. 5, 1994

[30] Foreign Application Priority Data

Oct. 15, 1993 [JP] Japan .................................. 5-281780

[51] Int. Cl.[6] ............................................... B32B 31/28

[52] U.S. Cl. .................................. 156/272.8; 156/272.2; 156/273.3; 156/281; 65/59.7; 219/121.64; 228/262.2; 228/903

[58] Field of Search ............................ 156/272.8, 273.3, 156/272.2, 379.6, 89, 281; 65/59.1, 59.7; 219/121.64; 228/262.2, 903

[56] References Cited

U.S. PATENT DOCUMENTS

| | | | |
|---|---|---|---|
| 4,050,956 | 9/1977 | de Brvin et al. | 156/89 X |
| 4,705,585 | 11/1987 | Kelly et al. | 156/89 |
| 4,914,269 | 4/1990 | Kinsman et al. | 219/121.64 |
| 4,927,475 | 5/1990 | Steinleitner | 156/89 |
| 5,074,941 | 12/1991 | Sass et al. | 156/89 |
| 5,193,738 | 3/1993 | Hayes . | |
| 5,306,891 | 4/1994 | Fleming et al. | 219/121.64 |
| 5,407,119 | 4/1995 | Churchill et al. . | |
| 5,427,638 | 6/1995 | Goetz et al. | 156/281 X |

FOREIGN PATENT DOCUMENTS

| | | | |
|---|---|---|---|
| 2135827 | 1/1973 | Germany | 156/89 |
| 2332881 | 1/1975 | Germany | 156/89 |
| 8140376 | 8/1983 | Japan | 228/262.2 |
| 0102876 | 6/1984 | Japan | 156/89 |
| 0016876 | 1/1985 | Japan | 219/121.64 |
| 0030593 | 2/1985 | Japan | 228/262.2 |
| 1296955 | 12/1986 | Japan . | |
| 2133378 | 5/1990 | Japan . | |

*Primary Examiner*—David A. Simmons
*Assistant Examiner*—Steven J. Helmer
*Attorney, Agent, or Firm*—Wenderoth, Lind & Ponack

[57] ABSTRACT

Proposed is a method for bonding of a ceramic body and a metallic body at a relatively low temperature not to cause substantial deformation or material degradation of the ceramic and metallic materials. The surface of the ceramic body is first irradiated with laser beams in vacuum so that the inorganic non-volatile constituent of the ceramic material, e.g. silicon when the ceramic is silicon nitride, is isolated on the surface of the ceramic body forming a layer. Thereafter, the metallic body is brought into contact with and pressed in vacuum against the thus laser beam-irradiated area of the ceramic body under an adequate pressing force and at an elevated but relatively low temperature which is, for example, not higher than 0.5Tm °C., Tm °C. being the melting point of the metallic material, so that the ceramic and metallic bodies are firmly bonded together. It is preferable that the surface of the metallic body is subjected beforehand to an activation or cleaning treatment, for example, by the bombardment with ion beams of an inert gas, e.g., argon.

2 Claims, 2 Drawing Sheets

METHOD FOR BONDING OF A CERAMIC BODY AND A METALLIC BODY

BACKGROUND OF THE INVENTION

The present invention relates to a method for bonding of a ceramic body and a metallic body. More particularly, the invention relates to an efficient method for firmly bonding a ceramic body and a metallic body to prepare a composite member consisting thereof having usefulness as a structural or functional part of various machines or electronic instruments without destroying the excellent properties inherent in the ceramic and metallic materials.

Needless to say, modern machines and electronic instruments are constructed sometimes by using a composite member which is a conjoined body of a ceramic part and a metallic part having quite different mechanical, electric and chemical properties from each other. Several methods are known for bonding a ceramic body and a metallic body to prepare a composite member thereof including a method by the use of an organic adhesive, a method for bonding by means of a brazing alloy, a method of direct bonding at a high temperature and under a high load, a method of frictional welding and so on. These conventional bonding methods are each not quite satisfactory in one or more respects. For example, the method of using an organic adhesive is defective in respect of the low adhesive bonding strength or low heat resistance of the adhesive. The method using a brazing alloy has a problem because the brazing alloy usually contains a flux which is sometimes corrosive against metals. The direct bonding method at a high temperature under a high load unavoidably has an adverse effect of deformation of the ceramic and metallic bodies and degradation of the properties thereof.

SUMMARY OF THE INVENTION

The present invention accordingly has an object, by overcoming the above described problems and disadvantages in the prior art methods for bonding a ceramic and metallic bodies, to provide a novel and improved method for efficiently and reliably bonding a ceramic body and a metallic body with a very high bonding strength and without deformation or a degradation in the inherent properties of the ceramic and metallic bodies so as to give a composite member consisting of the ceramic and metallic parts conjoined together.

Thus, the method of the present invention for bonding of a ceramic body and a metallic body comprises the steps of:

(a) irradiating the surface of the ceramic body in vacuum with a laser beam so as to isolate an inorganic or metallic non-volatile element which is a decomposition product of the ceramic material in the form of a layer on the surface of the ceramic body; and (b) pressing the metallic body in vacuum at a specified elevated temperature against the surface of the ceramic body covered with the layer of the inorganic or metallic non-volatile element as the decomposition product of the ceramic material under a pressing force to effect pressure welding.

It is preferable in performing the above defined inventive method that the surface of the metallic body at which the metallic body is bonded to the ceramic body on the laser beam-irradiated area is subjected beforehand to a cleaning or activating treatment in vacuum by the bombardment with ions of an inert gas or by the irradiation with an excimer laser beam. Further, the elevated temperature at which the ceramic body and the metallic body are bonded together by pressing can be in the range from room temperature to 0.5Tm °C., Tm °C. being the melting point of the metallic material.

DETAILED DESCRIPTION OF THE PREFERRED EMBODIMENTS

Figure 1:
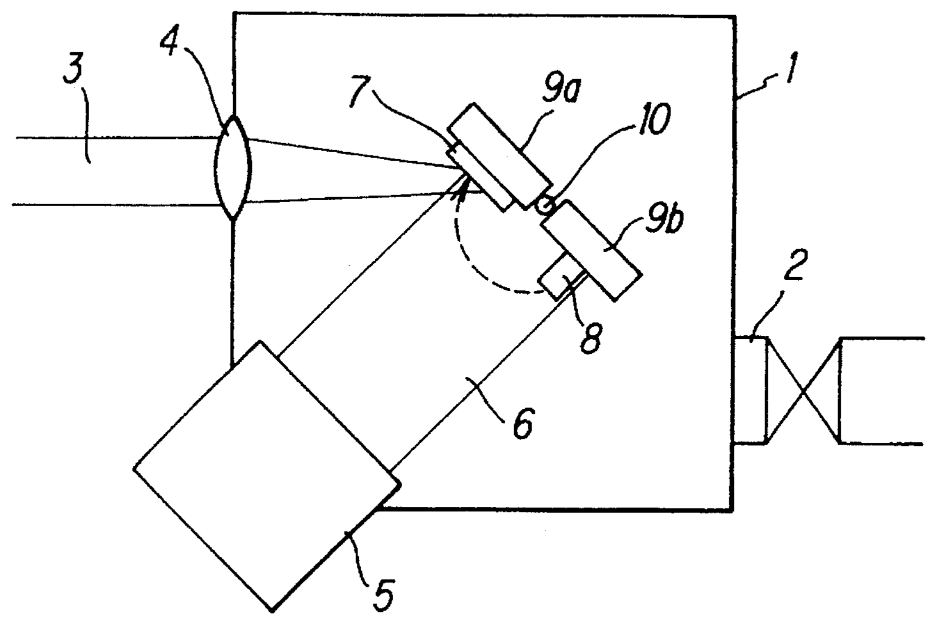
FIG. 1 is a schematic illustration of an apparatus for practicing the method of the present invention.

As is described above, the most characteristic feature of the inventive method consists in the pre-treatment of the surface of the ceramic body prior to pressure welding with the metallic body by the irradiation with a laser beam so as to isolate the inorganic or metallic non-volatile constituent of the ceramic material to form a surface layer.

The material of the ceramic body to which the inventive method is applied includes, though not particularly limitative, silicon nitride, aluminum nitride, silicon carbide and zirconium dioxide, of which the above mentioned inorganic or metallic non-volatile constituent is silicon, aluminum, silicon and zirconium, respectively.

Various types of lasers can be used for the laser beam irradiation of the ceramic surface including excimer lasers such as ArF lasers, KrF lasers, XeF lasers and XeCl lasers, YAG lasers, carbon dioxide lasers, TEA-carbon dioxide lasers, semiconductor lasers, dye lasers and the like without particular limitations.

The metallic material of the metallic body as the counterpart of the ceramic body is not particularly limitative and metallic bodies of various kinds of metals and alloys can be successfully bonded to a ceramic body according to the inventive method. It is desirable that, prior to pressure welding of the metallic body to the pre-treated ceramic body, the surface of the metallic body is subjected to an activation or cleaning treatment in high vacuum by the bombardment with inert gas ions or irradiation with an excimer laser beam so that the bonding strength between the ceramic and metallic bodies can be further increased. By this activation or cleaning treatment, the oxide layer on the metal surface can be removed and the absorbed gases can be degassed when the surface is subjected to pre-sputtering by the bombardment with ion beams of an inert gas such as argon from the ion source installed in a high-vacuum chamber or irradiation with laser beams.

In the method of the present invention, the surface of the ceramic body is irradiated with a laser beam as mentioned above so as to isolate the inorganic or metallic non-volatile element as a decomposition product of the ceramic material to form a layer over the area irradiated with the laser beam. Thereafter, the metallic body, preferably, after the activation or cleaning treatment of the surface is pressed against the surface of the ceramic body thus coated with a layer of the isolated inorganic or metallic non-volatile constituent of the ceramic material at an elevated temperature which can be relatively low not exceeding 0.5Tm °C., Tm °C. being the melting point of the metallic material, so that the ceramic body and the metallic body are bonded together firmly to give an integrally conjoined member consisting of a ceramic part and metallic part. The heating means here is not particularly limitative including electric resistance heating, infrared radiation, ion beam bombardment and the like but the most convenient method is to conduct bombardment with ion beams.

In the next place, an actual embodiment of the inventive method is described by making reference to the accompanying drawing. FIG. 1 is a schematic illustration of an apparatus for practicing the method of the present invention which consists of a vacuum chamber 1 connected to an evacuation system 2, focusing lens 4 to focus the laser beam 3 on to the surface of the ceramic body 7 as a part of the subject materials, ion beam generator 5 for the bombardment of the surface of the metallic body 8 as the counterpart of the subject materials with ion beams 6 and holders 9*a*, 9*b* for holding the ceramic body 7 and metallic body 8, respectively, in respective positions. The holder 9*b* can be pivotally rotated around the axis 10 so that the surface of the metallic body 8 held by the holder 9*b* after the activation or cleaning treatment is brought into contact with and pressed under an adequate pressing force against the surface of the ceramic body 7 held by the holder 9*a* after irradiation with the laser beams 3.

In the first place, the ceramic and metallic bodies 7, 8 are mounted on and fixed to the respective holders 9*a*, 9*b* in the vacuum chamber 1 which is then evacuated through the evacuation system 2 down to a pressure of about $5\times10^{-6}$ Torr followed by the introduction of a small volume of argon gas as an ion source material into the vacuum chamber 1. The ion beam generator 5 is then activated to produce ion beams 6 by the ionization of the argon molecules with which the surfaces of the ceramic body 7 and metallic body 8 are bombarded to effect activation or cleaning of the surface. Thereafter, the surface of the ceramic body 7 is irradiated with the laser beam 3 through the focusing lens 4 so as to isolate the inorganic non-volatile constituent in the ceramic material on the surface to form a coating layer over the irradiated area, with which the activated or cleaned surface of the metallic body 8 is brought into contact under an adequate pressing force by pivotally rotating the holder 9*b* around the axis 10 to effect press welding of the ceramic and metallic bodies 7, 8, which are heated by the bombardment with ion beams 6 to an elevated but relatively low temperature not exceeding 0.5Tm °C., Tm °C. being the melting point of the metallic material.

The thus obtained integrally conjoined body consisting of the ceramic and metallic parts can be used advantageously with high reliability as a part of various kinds of machines and electronic instruments because bonding of the ceramic and metallic bodies can be efficiently conducted at a relatively low temperature at which each of the ceramic and metallic materials is safe from degradation of the material and deformation of the bodies.

In the following, the method of the present invention is described in more detail by way of examples, which, however, never limit the scope of the invention in any way.

EXAMPLE 1

Experiment was conducted by using the apparatus schematically illustrated in FIG. 1. In the first place, a 15 mm by 10 mm wide plate of silicon nitride 7 having a thickness of 1 mm and a cylindrical rod of pure copper 8 having a diameter of 6 mm and length of 10 mm were mounted on and fixed to the holders 9*a* and 9*b*, respectively, installed in the vacuum chamber 1 which was evacuated down to a pressure of about $5\times10^{-6}$ Torr. Each of the ceramic and metallic bodies 7, 8 was bombarded for 5 minutes with ion beams of argon at an accelerating voltage of 4 kV with a current density of 0.15 mA/cm$^2$ on the surface to effect activation or cleaning of the surfaces. Thereafter, the surface of the silicon nitride plate 7 over an elliptic area having a longer axis of 6 mm and a shorter axis of 2 mm was irradiated pulsewise with 100 pulses of a laser beam 3 from a KrF excimer laser focused by means of a focusing lens 4 of fused quartz glass to give an average energy density of 0.3 J/mm$^2$ per pulse on the irradiated area so that elementary silicon was isolated on the irradiated area to form a layer of the element. The copper rod 8 held on the holder 9*b* was rotated around the axis 10 so that the end surface of the copper rod 8 was brought into contact with the surface of the silicon nitride plate 7 on the area irradiated with the laser beam and pressed against the silicon-coated silicon nitride surface with a pressing force of 16 kg corresponding to a pressure of 20–25 kgf/mm$^2$ for 1 hour, during which the copper rod 8 and the silicon nitride plate 7 were heated at a temperature not exceeding 350° C. for 1 hour by resuming the bombardment with argon ions at an accelerating voltage of 4 kV with a current density of 0.4 mA/mm$^2$.

Figure 2:
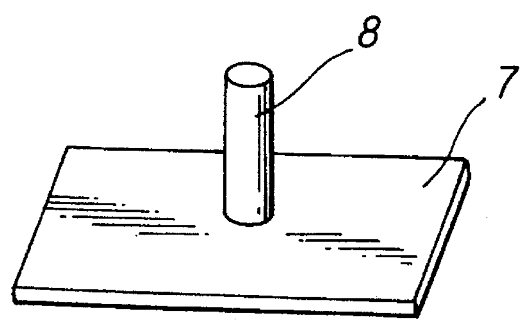
FIG. 2 is a perspective view of a composite body consisting of a ceramic part and a metallic part prepared in the Examples according to the inventive method.

FIG. 2 of the accompanying drawing is a perspective view of the thus obtained integral body consisting of the silicon nitride plate 7 and the copper rod 8 bonded together. Substantially no denaturation of the silicon nitride surface or deformation of the copper rod was found excepting microscopic deformation of the end surface of the copper rod to fill up the microscopic ruggedness of the ceramic surface because the bonding was conducted at a temperature much lower than the decomposition temperature of silicon nitride, i.e. 1878° C., and melting point of copper, i.e. 1083° C.

Figure 3:
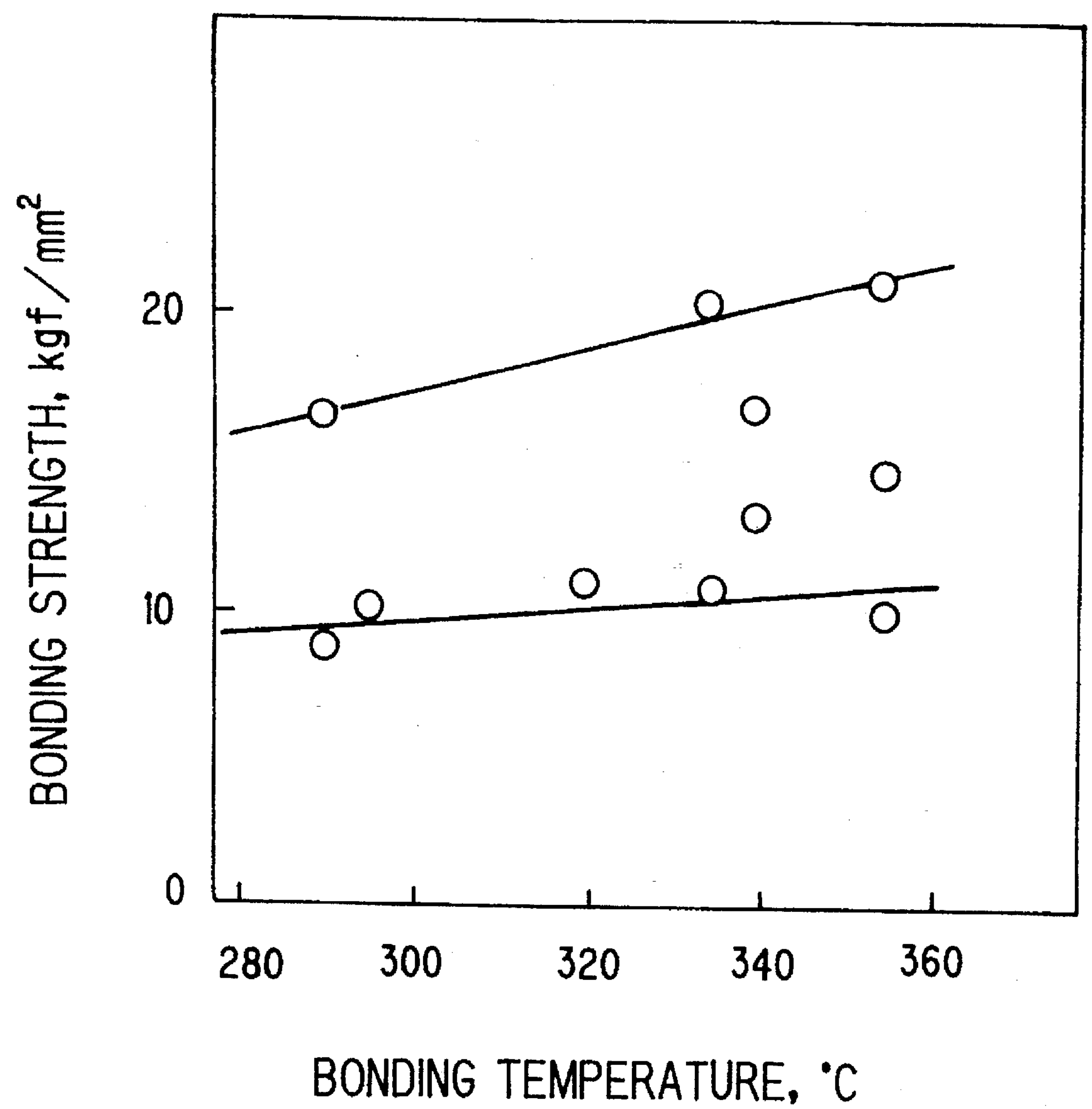
FIG. 3 is a graph showing the bonding strength between the ceramic part and the metallic part of the integrally bonded composite bodies prepared in Example 1 as a function of the temperature of bonding.

The above described bonding procedure of a silicon nitride plate and a copper rod was repeated in substantially the same manner except that the temperature of heating during press-bonding was varied in the range from 280° C. to 36020 C. by adjusting the current density of the argon ion beams and the thus integrally conjoined bodies were subjected to the measurement of the bonding strength between the part of silicon nitride and the part of copper to give the results shown by the graph in FIG. 3 of the accompanying drawing as a function of the bonding temperature. As is shown in this figure, the bonding strength was at least 10 kg/mm$^2$ in each of the experiments evidencing the practical usefulness of the inventive method.

The two solid lines in FIG. 3 encompass the range in which the values of the bonding strength as determined are distributed and do not represent the average values. Needless to say, a parameter such as the interfacial bonding strength is unavoidably subject to a considerably large variation, even if the preparation and testing conditions are identical. In other words, the lower line indicates a lower limit of the bonding strength which can be likely obtained according to the inventive method, while the upper line indicates the upper limit of the bonding strength which can hardly be exceeded by the inventive method.

EXAMPLE 2

The same experimental procedure as in Example 1 was repeated by replacing the silicon nitride plate with an aluminum nitride plate of the same dimensions. The results were as satisfactory as in Example 1 with no denaturation of the ceramic and metallic materials and substantially no deformation of the bonded parts excepting microscopic deformation of the end surface of the copper rod as mentioned in Example 1.

What is claimed is:

1. A method for bonding of a ceramic body and a metallic body which consists essentially of the steps of:

(a) irradiating the surface of the ceramic body in vacuum with a laser beam so as to isolate an inorganic or metallic non-volatile element which is a decomposition product of the ceramic material in the form of a layer on the surface of the ceramic body;

(b) subjecting the surface of the metallic body which is to be bonded to the surface of the ceramic body of step (a) to a cleaning or activating treatment in vacuum by the bombardment with ions of an inert gas or by irradiation with an excimer laser beam; and then (c) pressing the surface of the metallic body of step (b) in vacuum at an elevated temperature against the surface of the ceramic body covered with the layer of the inorganic or metallic non-volatile element as the decomposition product of the ceramic material of step (a) to effect pressure welding.

2. The method for bonding of a ceramic body and a metallic body as claimed in claim 1 in which the elevated temperature at which the metallic body and the ceramic body are pressed against each other in step (c) is in the range from room temperature to 0.5Tm °C., Tm °C. being the melting point of the metallic material.

* * * * *